United States Patent Office 3,503,912
Patented Mar. 31, 1970

3,503,912
TRIS (2-HEXOXYETHYL) PHOSPHATE LEVELING AGENT IN EMULSION FLOOR POLISH
Charles Andrew Lynch, Jr., Severna Park, Md., assignor to FMC Corporation, New York, N.Y., a corporation of Delaware
No Drawing. Filed Apr. 7, 1967, Ser. No. 629,070
Int. Cl. C09g 1/10
U.S. Cl. 260—28.5        2 Claims

ABSTRACT OF THE DISCLOSURE

This application discloses the use of tris(2-hexoxyethyl) phosphate as a superior leveling agent for polymer emulsion floor polishes. The use of from ¼ to 2% of tris(2-hexoxyethyl) phosphate as a leveling agent in emulsion floor polishes will cause polishes that would otherwise be splotchy, uneven, or puddled to flow out to smooth, glossy, uniform films. The tris(2-hexoxyethyl) phosphate confers excellent appearance and high gloss, and additionally has satisfactory plasticizing action for the polymer components in the emulsion floor polish composition.

BACKGROUND OF THE INVENTION

Field of the invention

This invention relates to the use of tris(2-hexoxyethyl) phosphate as an effective leveling agent in producing improved emulsion floor polish compositions.

Description of the prior art

Emulsion floor polishes are aqueous emulsions of thermoplastic polymers, wax or waxy resins, combined with solutions of special ammonia-soluble resins which act as binders for the emulsified resinous materials. These are invariably used in conjunction with a leveling additive which gives flexibility to the film and prevents crawling, puddling, crazing or cracking. The most universally used additive for this purpose is tris(2-butoxyethyl) phosphate. This material performs excellently, since it combines fine leveling ability with good water resistance, and in the final formulations has very little deleterious effect on most substrates.

Attempts to find suitable leveling agents to replace tris(2-butoxyethyl) phosphate have been largely unsuccessful for more than fifteen years. Unexpectedly very similar phosphates of similar molecular structure such as tris(2-ethoxyethyl) phosphate, tris(4-ethoxybutyl) phosphate, tris[2-(2-ethylhexyloxy)ethyl] phosphate, and like isomers and homologs are not satisfactory leveling agents. A recent article, leveling of Emulsion Floor Polishes, Soap and Chemical Specialties, 42, 56 (1956) by D. A. Lima and T. R. Hopper, presents the results of a detailed study of the evaluation of a number of organophosphorus esters as new leveling agents for emulsion floor polishes. Twenty-one organophosphorus esters including tris(2-ethoxyethyl) phosphate were examined as leveling agents. None of the twenty-one compounds was observed to perform as well as tris(2-butoxyethyl) phosphate.

Certain perfluorocyclo compounds such as perfluorinated, alkyl-substituted cyclohexane acids and salts thereof are commonly suggested as leveling agents, but these compounds are expensive and have always been used in conjunction with tris(2-butoxyethyl) phosphate.

Additional additives conventionally used in emulsion floor polishes include plasticizers, solvents, fungicides, masking agents, coalescing and slip-proofing agents.

SUMMARY OF THE INVENTION

I have found, surprisingly, that while very few phosphates other than tris(2-butoxyethyl) phosphate are useful in emulsion floor polish compositions, a specific phosphate, tris(2-hexoxyethyl) phosphate, is indeed a superior leveling agent for emulsion floor polishes, producing polishes which have excellent gloss, good water resistance and good scuff resistance. It is quite surprising that this phosphate will act in this fashion when other phosphates which are closely related in structure to tris(2-butoxyethyl) phosphate give unsatisfactory results. Closely related compounds such as tris(2-ethoxyethyl) phosphate, tris(2-butoxyethyl) thiophosphate and tris[2-(2-ethylhexyloxy)ethyl] phosphate as well as many compounds evaluated by Lima and Hopper, including other analogs of tris(2-butoxyethyl) phosphate were found to give unsatisfactory results when incorporated as leveling agents in emulsion floor polish compositions.

Tris(2-hexoxyethyl) phosphate was prepared by reacting 2-hexoxyethanol with metallic sodium in xylene under nitrogen to form sodium 2-hexoxyethylate. To this material was added phosphorus oxychloride. The reaction mixture was quenched, neutralized, washed, filtered, decolorized and stripped to give an excellent yield of tris(2-hexoxyethyl) phosphate.

A tris(2-hexoxyethyl)phosphate produced had the following properties:

Acid No. _____ 0.44
Hydroxyl No. _____ 2.85
Refractive index $N_D^{25}$ _____ 1.4423
Specific gravity at 25°/25° C. _____ 0.9804
Color, APHA _____ 60
Phosphorus content, 6.12% (theory 6.42%).

DESCRIPTION OF THE PREFERRED EMBODIMENTS

The tris(2-hexoxyethyl) phosphate of this invention is used in emulsion floor polish compositions in rather low concentrations, of the order of about ¼ to 2%, depending on the solids content of the polish, which is generally of the order of 10 to 16%. Optimum results were obtained at about 15% solids with about 0.5% of the leveling agent, based on the total polish weight.

The emulsified thermoplastic resins in these emulsion floor polishes, such as polystyrene, polyacrylate, polyacrylate-acrylonitirile resins are chosen for both their good properties and their low cost. The polystyrene resins are often sold blended with a small amount of shellac. The wax, or a wax substitute, includes materials such as carnauba, montan, paraffin, polyethylene, or Fischer-Tropsch waxes, and the like. These waxes and resins generally comprise about 75% to 90% of the total solids of the emulsion. Mixed with these materials are ammonia solutions of other thermoplastic resins, such as partially esterified modified rosin, and styrene/maleic copolymers, and other similar thermoplastics which are ammonia-soluble. These ammonia solutions act to unify the film and level it somewhat, and upon evaporation of the ammonia, the resins become water-insoluble along with the rest of the material. Coalescing agents such as ethylene glycol, 2-ethoxyethanol, 2-butoxyethanol, pyrrolidone, and so forth, function as solvents to maintain the homogeneity of the organic components in a largely aqueous system.

Leveling agents promote the wetting of the substrate by the polymer emulsion floor polish so that an even distribution of the polish is achieved. This results in a smooth film with even gloss.

Tris(2-butoxyethyl) phosphate has been the leveling agent of choice in most of the published literature concerning polymer emulsion floor polishes.

The resins and formulations for producing emulsion polymer floor polishes are quite well known in the trade, being extensively described in the technical data bulletins of the various suppliers of the resins for use in emulsion floor polishes.

The following typical examples, numbered 1 to 10, illustrate this invention using tris(2-hexoxyethyl) phosphate as a leveling agent in floor polish compositions. These are given by way of example and not by way of limitation of the invention. Comparison examples A–I incorporating other phosphorus containing leveling agents in typical emulsion floor polishes were prepared and evaluated. The examples and comparison examples are listed in tabular form in Table I in which the tris(2-hexoxyethyl) phosphate leveling agent is compared with other organophosphorus leveling agents in a number of typical emulsion floor polish compositions. The evaluation of these floor polish compositions is set forth in Table II. All parts and percentages are by weight.

The trademarked materials appearing in Tables I and III are identified as to source in the footnotes following Table III.

TABLE I.—FLOOR POLISH FORMULATIONS

|  | A | 1 | 2 | B | 3 | 4 | C | 5 | 6 | D | 7 | 8 | E | 9 | 10 |
|---|---|---|---|---|---|---|---|---|---|---|---|---|---|---|---|
| (a) Shellac-modified styrene emulsion at 15% solids (Synthemul 40-431)[1] | 70 | 70 | 70 | | | | | | | | | | | | |
| (b) Acrylic interpolymer emulsion at 15% solids (Ubatol 3400)[2] | | | | 75 | 75 | 75 | | | | | | | | | |
| (c) Acrylic-acrylonitrile latex at 15% solids (Morton AA415)[3] | | | | | | | 72 | 72 | 72 | | | | | | |
| (d) Modified polystyrene emulsion, light-colored at 15% solids (Morton RWL-100LC)[3] | | | | | | | | | | 70 | 70 | 70 | | | |
| (e) Modified polystyrene emulsion (Ubatol 2001)[2] | | | | | | | | | | | | | 65 | 65 | 65 |
| (f) Acrylic latex at 15% solids (Morton 200)[3] | | | | | | | | | | | | | 12.5 | 12.5 | 12.5 |
| (g) Emulsifiable polyethylene, MW about 2,500 at 15% solids (Epolene E-10)[4] | 15 | 15 | 15 | | | | | | | | | | 10 | 10 | 10 |
| (h) Polyethylene emusion, pH stable anionic at 15% solids (Poly-EM 20)[5] | | | | 5 | 5 | 5 | | | | | | | | | |
| (i) Low molecular weight emulsifiable polyethylene. Melting point 212-231° F., acid #14-17 at 15% solids (AC-629)[6] | | | | | | | 12 | 12 | 12 | 12 | 12 | 12 | | | |
| (j) Ammonia-soluble resin acid #120-130 at 15% solids (Waterez 40-584)[1] | 15 | 15 | 15 | | | | | | | | | | | | |
| (k) Ammonia-, amine-, and alkalisoluble resin at 15% solids (Shanco 334)[7] | | | | 10 | 10 | 10 | 16 | 16 | 16 | | | | | | |
| (l) Ammonia-soluble resin, M.P. 148-158° C. at 15% solids (Shanco 1165-S)[7] | | | | 10 | 10 | 10 | | | | 18 | 18 | 18 | | | |
| (m) Styrene-maleic anhydride copolymer, ammonia-soluble, acid #220 at 15% solids (SMA 2625H)[8] | | | | | | | | | | | | | 12.5 | 12.5 | 12.5 |
| (n) Ethoxyethoxyethanol | 1.0 | 1.0 | 1.0 | 1.0 | 1.0 | 1.0 | 1.5 | 1.5 | 1.5 | 1.5 | 1.5 | 1.5 | | | |
| (o) Pyrrolidyne | | | | 0.4 | 0.4 | 0.4 | 0.35 | 0.35 | 0.35 | | | | 0.4 | 0.4 | 0.4 |
| (p) Tris(2-butoxyethyl) phosphate | 0.5 | | | 0.4 | | | 0.35 | | | 0.4 | | | 1.0 | | |
| (q) Tris (hexoxyethyl) phosphate | | 0.3 | 0.5 | | 0.3 | 0.5 | | 0.3 | 0.4 | | 0.3 | 0.5 | | 0.8 | 1.2 |
| (r) Cationic fluorocarbon surfactant (1%) (FC-128)[9] | 0.5 | 0.5 | 0.5 | | | | 0.5 | 0.5 | 0.5 | | | | | | |
| (s) Anionic fluorocarbon surfactant (1%) (FC-134)[9] | | | | | | | | | | 0.5 | 0.5 | 0.5 | | | |
| (t) Nonylphenoxy poly (ethyleneoxy)ethanol (Igepal CO-630)[10] | | | | 0.35 | 0.35 | 0.35 | | | | | | | 0.3 | 0.3 | 0.3 |

For footnotes, see end of Table III.

TABLE II.—EVALUATION OF FLOOR POLISH FORMULATIONS

|  | A | 1 | 2 | B | 3 | 4 | C | 5 | 6 | D | 7 | 8 | E | 9 | 10 |
|---|---|---|---|---|---|---|---|---|---|---|---|---|---|---|---|
| Removability [a] | 100 | 100 | 100 | 90 | 90 | 80 | 50 | 50 | 80 | 100 | 100 | 100 | 75 | 90 | 90 |
| Gloss (60° Gardner): | | | | | | | | | | | | | | | |
|   White vinyl | 83 | 77 | 82 | 80 | 80 | 79 | 85 | 80 | 84 | 92 | 90 | 89 | 87 | 90 | 83 |
|   Black vinyl-asbestos | 57 | 57 | 57 | 57 | 56 | 59 | 64 | 60 | 66 | 67 | 67 | 65 | 61 | 64 | 60 |
| Leveling and appearance:[b] | | | | | | | | | | | | | | | |
|   White vinyl | 2 | 2 | 2 | 2 | 2 | 2 | 4 | 4 | 3 | 2 | 2 | 2 | 1 | 1 | 1 |
|   Black vinyl-asbestos | 2 | 2 | 1 | 2 | 2 | 2 | 4 | 3 | 3 | 1 | 1 | 2 | 1 | 1 | |
|   Black asphalt | 2 | 2 | 2 | 2 | 2 | 2 | 2 | 2 | 2 | 4 | 3 | 1 | 1 | 1 | 1 |
|   Paper | 2 | 2 | 1 | 2 | 2 | 2 | 2 | 3 | 2 | 3 | 3 | 2 | 2 | 1 | 1 |
| Water spot resistance:[c] | | | | | | | | | | | | | | | |
|   15 minutes | 5 | 5 | 5 | 5 | 5 | 5 | 5 | 5 | 5 | 5 | 5 | 5 | 4.5 | 4.5 | 5 |
|   30 minutes | 5 | 5 | 5 | 5 | 5 | 5 | 5 | 5 | 5 | 4.5 | 5 | 5 | 3 | 3 | 3 |
|   45 minutes | 5 | 5 | 5 | 5 | 5 | 5 | 5 | 5 | 5 | 2 | 4 | 2 | 1.5 | 1.5 | 2 |
|   60 minutes | 5 | 5 | 5 | 5 | 5 | 5 | 5 | 5 | 5 | 2 | 4 | 1.5 | 1 | 1 | 1 |

[a] 0.4 ml. 2% potassium oleate at pH 10 (NH$_4$OH), percent removed after 10 brush strokes; 100% is best.

[b] Ratings:
  1—Perfect, no defects to naked eye.
  2—Excellent, slight visible defects.
  3—Good, some puddling and/or drawing in and/or beading.
  4—Fair, widespread drawing in.
  5—Poor, gross defects but some leveling.
  6—Bad, no leveling, usually incompatible.

[c] Polish applied and several drops distilled; water applied for one minute after indicated interval.
Ratings:
  1—Perfect, no effect.
  2—Very sl. penetration.
  3—Moderate penetration.
  4—Severe penetration.
  5—Complete penetration.

TABLE III.—FLOOR POLISH COMPOSITIONS

| Ingredients | F | G | H | I |
|---|---|---|---|---|
| Shellac-modified styrene emulsion at 15% nonvolatiles (Synthemul 40-203)[1] | 70 | 70 | 70 | 70 |
| Ammonia-soluble resin, M.P. 148-158° C. acid #180-190 at 15% nonvolatiles (Shanco 1165-S)[7] | 15 | 15 | 15 | 15 |
| Low M.W. polyethylene, emulsifiable, M.P. 212-213° F., acid #14-17 at 15% nonvolatiles (AC-629)[6] | 15 | 15 | | |
| pH stable anionic polyethylene emulsion at 15% nonvolatiles (Poly-EM 20)[5] | | | 15 | 15 |
| Carbitol[11] | 1.5 | 1.5 | 1.5 | 1.5 |
| Tris[2-ethylhexyloxy)ethyl] phosphate | .03 | 0.7 | 0.3 | 0.7 |

[1] Reichhold Chemicals Inc.
[2] UBS Chemical Division.
[3] Morton Chemical Division.
[4] Eastman Chemical Products, Inc.
[5] Gulf Oil Corporation.
[6] Allied Chemical Corp., Plastics Division.
[7] Shanco Plastics and Chemicals, Inc.
[8] Sinclair Petrochemicals, Inc.
[9] Minnesota Mining and Manufacturing Co.
[10] General Aniline and Film Corp.
[11] Union Carbide Corp., Chemicals Division.

None of the polishes showed leveling. All showed selective wetting of the substrate, indicating preferential wetting by the phosphate additive and no wetting at all by the polish.

As will be apparent to those skilled in the art, numerous modifications and variations of the embodiments illustrated above may be made without departing from the spirit of the invention or the scope of the following claims.

What is claimed is:

1. An emulsion floor polish composition comprising a major portion of a water-insoluble polymer, including a waxy material, and a minor proportion of an ammonia-soluble resin, and from ¼ to 2% leveling agent, based on the total weight of the polish composition, in which the improvement consists of using as a leveling agent tris (2-hexoxyethyl) phosphate.

2. The floor polish composition of claim 1 in which the leveling agent is used in the amount of 0.3 to 1.2% by weight, based on the total weight of the polish composition.

References Cited

UNITED STATES PATENTS 3,290,264   12/1966   Baranaukas _____ 260—950

OTHER REFERENCES

D. A. Lima and T. R. Hopper, "Leveling of Emulsion Floor Polishes," Soap and Chemical Specialties, pp. 42, 56, 1966.

MORRIS LIEBMAN, Primary Examiner

P. R. MICHL, Assistant Examiner

U.S. Cl. X.R.

260—27, 29.6